United States Patent
von Zeppelin et al.

(10) Patent No.: US 8,330,592 B2
(45) Date of Patent: Dec. 11, 2012

(54) COLLISION WARNING DEVICE FOR MOTOR VEHICLES

(75) Inventors: Frank von Zeppelin, Stuttgart (DE); Oliver Schwindt, Farmington Hills (DE)

(73) Assignee: Robert Bosch GmbH, Stuttgart (DE)

( * ) Notice: Subject to any disclaimer, the term of this patent is extended or adjusted under 35 U.S.C. 154(b) by 439 days.

(21) Appl. No.: 12/305,477

(22) PCT Filed: Jan. 31, 2008

(86) PCT No.: PCT/EP2008/051170
§ 371 (c)(1),
(2), (4) Date: Nov. 18, 2009

(87) PCT Pub. No.: WO2008/113637
PCT Pub. Date: Sep. 25, 2008

(65) Prior Publication Data
US 2010/0052884 A1 Mar. 4, 2010

(30) Foreign Application Priority Data
Mar. 22, 2007 (DE) .............................. 102007013685

(51) Int. Cl.
*B60Q 1/00* (2006.01)

(52) U.S. Cl. ........ 340/435; 340/903; 340/928; 340/436; 701/121; 348/148

(58) Field of Classification Search .................. None
See application file for complete search history.

(56) References Cited

U.S. PATENT DOCUMENTS

| | | | |
|---|---|---|---|
| 2001/0025211 A1* | 9/2001 | Shirai et al. ........................ 701/1 |
| 2004/0088095 A1* | 5/2004 | Eberle et al. ..................... 701/45 |
| 2005/0010351 A1* | 1/2005 | Wagner et al. .................. 701/96 |
| 2005/0134440 A1* | 6/2005 | Breed ........................... 340/435 |
| 2005/0165550 A1 | 7/2005 | Okada |
| 2007/0010938 A1* | 1/2007 | Kubota et al. .................. 701/200 |
| 2007/0198188 A1* | 8/2007 | Leineweber et al. .......... 701/300 |
| 2009/0210114 A1* | 8/2009 | Baumann et al. ................ 701/45 |
| 2010/0114490 A1* | 5/2010 | Becker ........................... 701/301 |

FOREIGN PATENT DOCUMENTS

| | | |
|---|---|---|
| DE | 101 03 401 | 8/2002 |
| DE | 10345802 | 4/2005 |
| DE | 102005028370 | 12/2006 |
| DE | 102006000326 | 1/2007 |
| JP | 2005-145282 | 6/2005 |

OTHER PUBLICATIONS

International Search Report, PCT/EP2008/051170 dated Jan. 31, 2008.

* cited by examiner

*Primary Examiner* — Benjamin C Lee
*Assistant Examiner* — Rajsheed Black-Childress
(74) *Attorney, Agent, or Firm* — Kenyon & Kenyon LLP

(57) ABSTRACT

A collision warning device for motor vehicles includes a locating sensor, a lane recognition module for detecting the number of traffic lanes in the road on which the vehicle is traveling, and a decision unit to output a warning signal if a danger parameter (ttc) determined using the data from the locating sensor exceeds a threshold value, the threshold value being variable depending on the number of traffic lanes in such a way that the warning signal is issued earlier when the number of lanes is greater.

26 Claims, 2 Drawing Sheets

COLLISION WARNING DEVICE FOR MOTOR VEHICLES

FIELD OF INVENTION

The present invention relates to a collision warning device for motor vehicles, having a locating sensor, a lane recognition module for detecting the number of traffic lanes of the road on which the vehicle is traveling, and a decision unit to output a warning signal if a danger parameter determined using the data from the locating sensor exceeds a threshold value.

BACKGROUND INFORMATION

Such collision warning devices are also referred to as PSS systems (predictive safety systems); their purpose is to call the attention of the driver to an imminent collision danger, for example by an acoustical signal, and/or to actively trigger emergency braking or other measures to avert the collision or to mitigate the consequences of the collision.

This is done by interpreting the data from a locating sensor, for example an angular resolution radar sensor, which makes it possible to measure the distances, relative velocities and azimuth angles of preceding vehicles. To assess the danger of collision, a danger parameter is calculated. This may be, for example, the so-called "time to collision" (ttc), which is calculated in advance under the assumption that the vehicles involved will maintain their present velocity or acceleration state. If the ttc drops below a certain threshold value (so that it passes the threshold in the direction of smaller values), a warning is triggered. Alternatively, the (negative) acceleration that would be necessary to avoid the collision may also be used as the danger parameter. An algebraic or logical function of the two parameters named above may also be used as the danger parameter.

PSS systems are frequently offered in combination with so-called ACC systems (adaptive cruise control), which serve to regulate the velocity of the vehicle in such a way that a vehicle traveling immediately ahead in the same lane is followed at an appropriately safe distance.

Based on the distances and azimuth angles measured by the radar sensor, the cross track distances of the located vehicles may be calculated, so that it is possible to decide whether a vehicle is in the same lane or an adjacent lane. At the same time, it is possible to determine in this way how many lanes the currently traveled road has and in which lane the host vehicle is traveling.

A collision warning system is described in German Patent Application No. DE 101 03 401 A1 in which a prevailing driver stress level is calculated from vehicle status variables, surroundings data and data about the driver's activity acquired from a sensor system, the driver stress level then providing the basis for the warning strategy. The surroundings data mentioned there also include the number of lanes of the road. However, there is no further explanation of how the number of travel lanes affects the driver stress level.

The choice of the threshold value for triggering the warning signal or warning always requires a compromise. On the one hand, the triggering threshold should be as low as possible, so that a warning is triggered as early as possible and enough time remains for the driver (or the system) to respond and avert the collision. On the other hand, a lower triggering threshold increases the frequency of false warnings, which the driver may find irritating or at least tiresome, and which, if they are too frequent, may result in the driver shutting off the system altogether.

Especially problematic in this connection are PSS systems that react not only to moving objects, for example other moving vehicles, but also to stationary objects. Since stationary objects by the roadside occur relatively frequently, and since due to uncertainties in predicting the course of the route it is not always possible to decide with certainty whether the object really constitutes a relevant obstacle or is located by the roadside or at least away from the anticipated travel path of the host vehicle, the danger of false warnings is especially great here.

For example, when the moment of warning is too early, false warnings may occur frequently if a traffic sign or the like standing by the roadside is located before the vehicle enters a curve and is erroneously interpreted as an obstacle. In practice therefore, up to now a high triggering threshold and a correspondingly late warning moment have been chosen for stationary objects. This greatly limits the usefulness of the system, however, since only a correspondingly short advance warning period then remains, even in situations of genuine danger.

SUMMARY OF THE INVENTION

An object of the present invention is to create a collision warning device of the type described at the beginning which allows an early warning time but only issues false warnings infrequently.

This problem is solved according to the present invention by the fact that the threshold value is variable depending on the number of traffic lanes, in such a way that the warning signal is issued earlier when there are more lanes.

The present invention is based on the consideration that on multiple-lane roads one normally drives only around curves with low lateral dynamics. While relatively tight curves may occur on one or two-lane roads, the curves on multiple-lane roads generally have a larger radius. In the case of multiple-lane roads, when a potential obstacle is detected, in particular a stationary object, it is therefore possible in any case to assume a greater lower limit for the radius of curvature of the roadway than on one-lane or two-lane roads, even if the exact course of the route is not known. As a result, on multiple-lane roads it is possible to decide already at an earlier point in time whether the detected object is on the roadway or by the roadside. This is utilized according to the present invention to lower the triggering threshold on multiple-lane roads, i.e., to change it in terms of an earlier warning, so that more reaction time remains for averting the collision, without an increase in the danger of false warnings.

The present invention is advantageous in the case of trucks, which generally travel with lower lateral dynamics than passenger cars. At a typical truck expressway speed of around 90 km/h, a warning may typically be issued on multiple-lane roads already at a ttc of 3-4 seconds, without an increase in the frequency of false warnings. This advance warning time is generally still adequate at the indicated velocity to avoid a collision, for example when approaching a traffic jam. In this way the danger of accidents, especially those due to overtired truck drivers, is able to be reduced significantly.

The case is similar for passenger car drivers when the speed of travel is in the stated range. Since most road segments with an increased risk of congestion have a speed limit of 80 or 100 km/h anyway, the present invention makes a significant contribution to reducing the danger of accidents for passenger cars as well, or at least to alleviating the consequences of an accident.

The present invention is advantageous in the case of PSS systems that react not only to moving objects but also to stationary objects. In this case different triggering thresholds may be provided for stationary objects and moving objects, at least one of which, preferably that for stationary objects, is variable depending on the number of lanes.

To determine the triggering threshold, it is expedient in connection with the present invention to count not only the lanes in the direction the host vehicle is traveling, but also the oncoming lanes. In this case it is also possible to differentiate between two-lane roads (with one lane in each direction) and one-lane (single-lane) roads, on which especially high lateral dynamics may be expected. It is also possible to detect three-lane rural roads, on which one of the two roadways has a passing lane or a slow traffic lane.

According to one refinement of the present invention, the triggering threshold may also be made dependent on whether the host vehicle is in the outermost right-hand lane or the passing lane on a road with multiple lanes in each direction. If the host vehicle is in the passing lane, it is possible to determine with certainty already at a relatively great distance that an object that is detected with a small azimuth angle is an obstacle on the roadway, so that the warning is able to be issued already at a correspondingly long ttc.

The number of traffic lanes is able to be determined with known algorithms on the basis of the data from the radar sensor. Optionally or in addition, however, other sensors may be used for this purpose, for example a video sensor. With advanced navigation systems it is likewise conceivable for the information about the number of traffic lanes to be derived from the navigation system.

If the number of traffic lanes is detected solely with the aid of the radar sensor, it may not be possible to recognize oncoming lanes reliably on expressways having two or more lanes. It is sufficient in that case, however, if the determination of the triggering threshold is made on the basis of the number of lanes in one direction.

DETAILED DESCRIPTION

Figure 1:
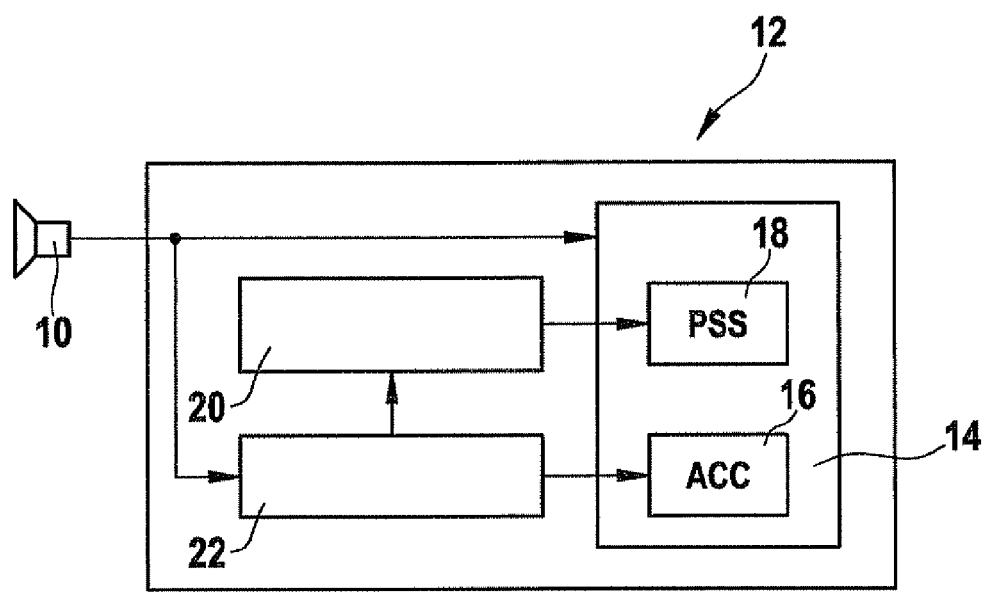
FIG. 1 shows a block diagram of a driver assistance system.

The collision warning device shown in FIG. 1 is part of a driver assistance program that includes an angle resolution locating sensor 10, for example a radar sensor installed in the front of the vehicle, and an electronic data processing sensor 12 that evaluates the data provided by locating sensor 10 and performs two or more assistance functions 14 on that basis. In this example assistance functions 14 include a distance regulating function 16 (ACC) and collision warning function PSS.

As part of collision warning function PSS, a decision unit 18 initiates a collision warning (e.g., an audible warning) if a particular danger parameter exceeds a certain threshold value on the basis of the data from locating sensor 10. A special threshold value module 20 is provided to determine this threshold value, or possibly also a plurality of threshold values for a plurality of danger parameters or for different types of objects, such as stationary objects and moving objects.

A lane detecting module 22 recognizes and determines the number of traffic lanes of the road on the basis of the vehicles detected by locating sensor 10. Threshold value module 20 then determines the threshold value depending on the number of lanes, as will be explained in greater detail below.

Figure 2:
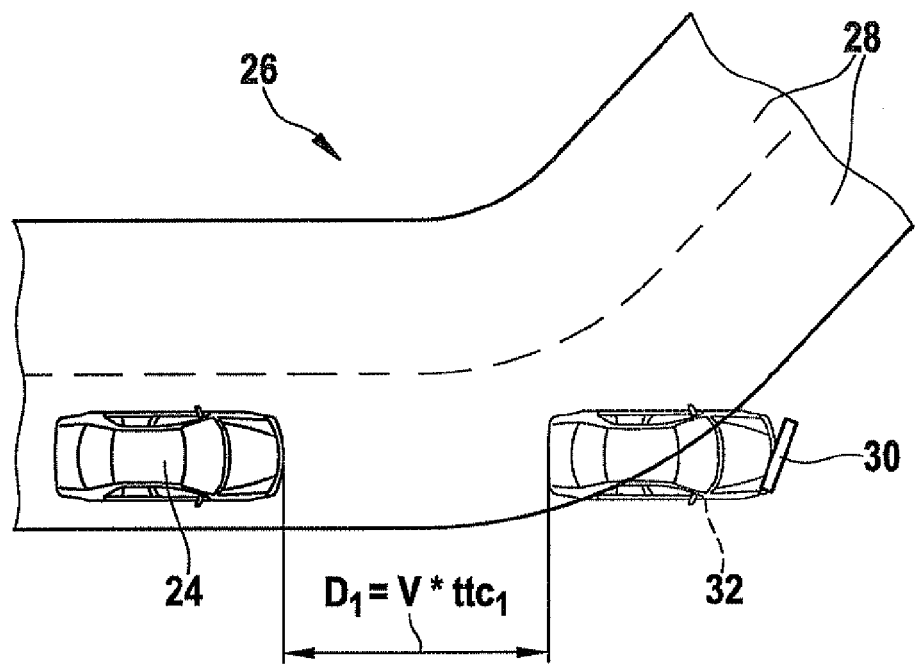
FIGS. 2 and 3 show sketches explaining a collision warning function.

FIG. 2 shows a typical traffic situation, on the basis of which the problems with regard to determining the threshold value for the collision warning function will be illustrated, in particular the problems with regard to warning of a collision with stationary objects. In the example shown in FIG. 2, a vehicle 24 equipped with the driver assistance system according to FIG. 1 is on a roadway 26 with two lanes 28, immediately before entering a relatively tight curve. Beside the road on the outer side of the curve is a conventional curve warning sign 30, which is intended to call the attention of drivers to a dangerous curve.

Curve warning sign 30 is situated within the locating range of locating sensor 10, and thus is detected as a stationary object. Since vehicle 24 has not yet entered the curve, it is not yet possible to detect the curved path of the roadway on the basis of the yaw velocity or the steering angle of this vehicle. From the perspective of the PSS system, curve warning sign 30 thus represents a potential obstacle that must be warned against if the precalculated time prior to impact ttc is less than a threshold value calculated in threshold value module 20. If too high a value is chosen, for example, for the ttc, the result is a collision warning that the driver regards as unnecessary and irritating.

FIG. 2 illustrates how a threshold value for the time to collision (ttc) may be determined so that such false warnings are prevented. If the object detected by locating sensor 10, symbolized here by a stationary vehicle 32 drawn with dashed lines, were to be a genuine obstacle that largely blocks relevant lane 28, the distance measured for this object could not be greater than distance $D_1$ sketched in FIG. 2. Otherwise the object could also be located at the side of the road beyond the curve. Distance $D_1$ is dependent on the curvature of road 26, and becomes greater as the radius of curvature increases. For an appropriate determination of the threshold value, the starting point should therefore be the smallest radius of curvature to be expected for curves on this type of road. Distance $D_1$ calculated for this radius of curvature and current velocity V of vehicle 24 then determine time to collision $ttc_1$, which would be suitable as the threshold value.

Figure 3:
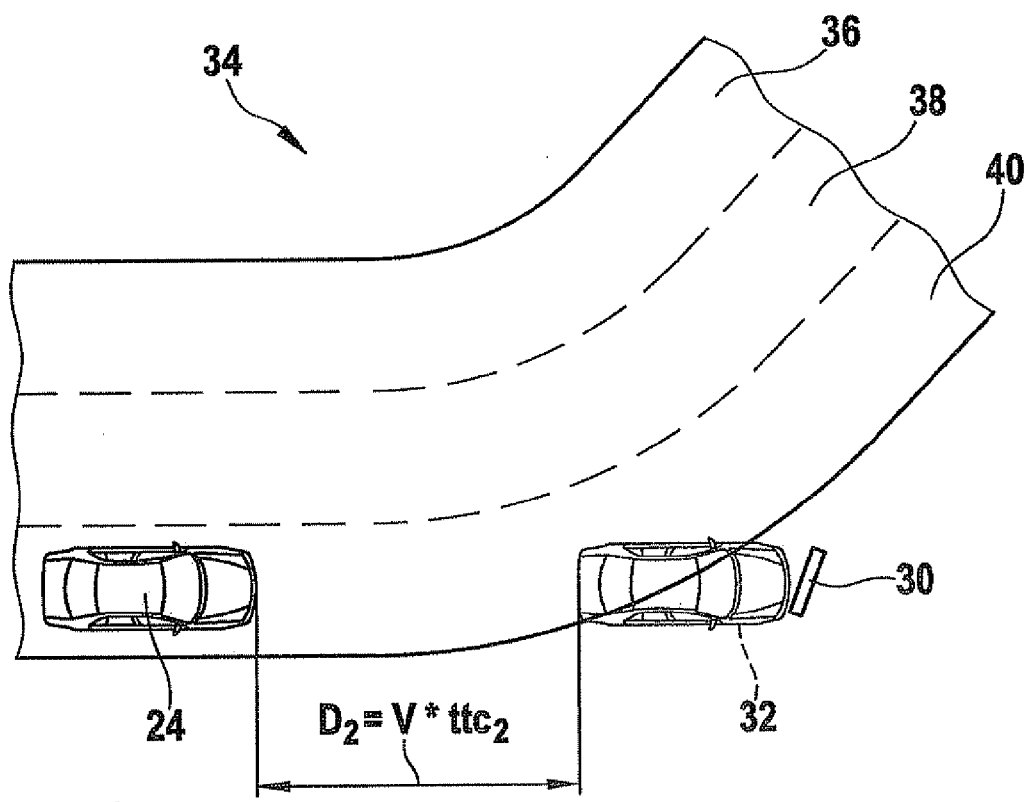

FIG. 3 illustrates a similar situation for a road 34 having three lanes 36, 38, 40. Since multiple-lane roads are generally designed for higher speeds, there is usually less curvature on such roadways. In particular, the curvature of lane 36 located on the inside of the curve must not become too great. Accordingly, lane 40 located at the outside of the curve has a relatively large radius of curvature here, and maximum distance $D_2$ of a real obstacle here is significantly greater than distance $D_1$ in FIG. 2. Accordingly, a larger value is obtained here as a suitable threshold value $ttc_2$ for the time to collision. False warnings are prevented with this choice of threshold value just as reliably as in the situation depicted in FIG. 2, but because of the greater time to collision, there is now significantly more time available for averting the collision.

Figure 4:
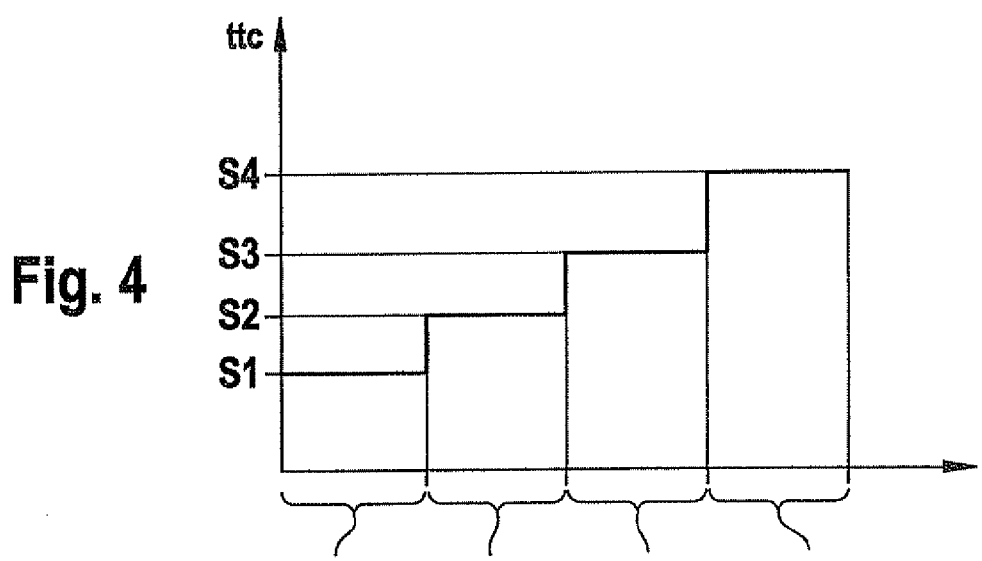
FIG. 4 shows a diagram illustrating the dependence of the triggering threshold on the number of travel lanes.

FIG. 4 uses a diagram to illustrate how the threshold value for the ttc varies for different types of road depending on the number of lanes.

For a road having only two lanes, i.e., one lane for each direction, a low threshold value S1 is chosen. In the case of a rural road with three lanes, for example a passing lane for one direction of travel, a somewhat higher threshold value S2 is chosen, independent of whether the passing lane is available for one's own travel direction or for the opposite direction.

For a four-lane road, for example an expressway with two lanes in each direction, an even higher threshold value S3 is chosen. This threshold value is appropriate even if the host vehicle is traveling in the right-most lane, so that stationary objects by the roadside, for example curve warning sign 30 in FIG. 2 or 3, may be at a relatively short distance.

If it is determined in addition on such a four-lane road that the host vehicle is traveling in the passing lane, an even higher threshold value S4 may be chosen.

A suitable threshold value may also be determined in an analogous manner for a road having three lanes for each direction of travel. This threshold value may also depend on which of the three lanes is occupied by the host vehicle, and it will be highest (at least for stationary objects) when the host vehicle is traveling in the middle lane. This last illustrated case could result in a "false warning," however, if a stationary vehicle is detected in the next lane to the right when approaching a traffic jam, while on the other hand one's own (middle) lane is still free. However, since it must be anticipated in such a traffic situation that a vehicle from the next lane to the right will pull out into the free middle lane, a warning signal is entirely appropriate in this situation.

What is claimed is:

1. A collision warning device for motor vehicles, comprising:
    a locating sensor;
    a lane recognition module configured to recognize a number of traffic lanes in a road on which a host vehicle is traveling, wherein the number of traffic lanes include lanes in a direction the host vehicle is traveling and oncoming lanes; and
    a decision unit configured to output a warning signal if a danger parameter determined on a basis of data from the locating sensor exceeds a threshold value,
    wherein the threshold value is variable depending on the number of traffic lanes in such a way that the warning signal is issued earlier when there are more lanes.

2. The collision warning device according to claim 1, wherein the danger parameter is a function of a precalculated time to collision.

3. The collision warning device according to claim 1, wherein the danger parameter is a function of a necessary acceleration to avoid a collision.

4. The collision warning device according to claim 1, wherein the decision unit reacts to both moving and stationary objects detected by the locating sensor.

5. The collision warning device according to claim 4, wherein different threshold values are provided for stationary and moving objects, and at least the threshold value provided for stationary objects is variable depending on the number of traffic lanes.

6. The collision warning device according to claim 1, wherein the lane recognition module is configured to recognize the number of traffic lanes based on the data supplied by the locating sensor about detected objects.

7. The collision warning device according to claim 1, further comprising:
    a distance regulating system configured to regulate a distance of the host vehicle from a preceding vehicle traveling in a same lane.

8. A method for detecting a collision for motor vehicles, comprising:
    determining objects around a host vehicle by a locating sensor;
    calculating a number of traffic lanes in a road on which a host vehicle is traveling by a lane recognition module, the number of traffic lanes including lanes in a direction the host vehicle is traveling and oncoming lanes; and
    outputting a warning signal by a decision unit if a danger parameter determined on a basis of data from the locating sensor exceeds a threshold value,
    wherein the threshold value is variable depending on the number of traffic lanes in such a way that the warning signal is issued earlier when there are more lanes.

9. The method according to claim 8, wherein the danger parameter is a function of a precalculated time to collision.

10. The method according to claim 8, wherein the danger parameter is a function of a necessary acceleration to avoid a collision.

11. The method according to claim 8, wherein the decision unit reacts to both moving and stationary objects detected by the locating sensor.

12. The method according to claim 11, wherein different threshold values are provided for stationary and moving objects, and at least the threshold value provided for stationary objects is variable depending on the number of traffic lanes.

13. The method according to claim 8, wherein the lane recognition module is configured to recognize the number of traffic lanes based on the data supplied by the locating sensor about detected objects.

14. The method according to claim 8, further comprising:
    regulating a distance of the host vehicle from a preceding vehicle traveling in a same lane by a distance regulating system.

15. The method according to claim 8, further comprising:
    regulating a distance of the host vehicle from a preceding vehicle traveling in a same lane by a distance regulating system;
    wherein the danger parameter is a function of a precalculated time to collision.

16. The method according to claim 15, wherein the decision unit reacts to both moving and stationary objects detected by the locating sensor, and wherein different threshold values are provided for stationary and moving objects, and at least the threshold value provided for stationary objects is variable depending on the number of traffic lanes.

17. The method according to claim 15, wherein the lane recognition module is configured to recognize the number of traffic lanes based on the data supplied by the locating sensor about detected objects.

18. The method according to claim 8, further comprising:
    regulating a distance of the host vehicle from a preceding vehicle traveling in a same lane by a distance regulating system;
    wherein the danger parameter is a function of a necessary acceleration to avoid a collision.

19. The method according to claim 18, wherein the decision unit reacts to both moving and stationary objects detected by the locating sensor, and wherein different threshold values are provided for stationary and moving objects, and at least the threshold value provided for stationary objects is variable depending on the number of traffic lanes.

20. The method according to claim 18, wherein the lane recognition module is configured to recognize the number of traffic lanes based on the data supplied by the locating sensor about detected objects.

21. The collision warning device according to claim 1, wherein the danger parameter is a function of a precalculated time to collision, and wherein the decision unit reacts to both moving and stationary objects detected by the locating sensor.

22. The collision warning device according to claim 21, wherein different threshold values are provided for stationary and moving objects, and at least the threshold value provided for stationary objects is variable depending on the number of traffic lanes.

23. The collision warning device according to claim 21, further comprising:

a distance regulating system configured to regulate a distance of the host vehicle from a preceding vehicle traveling in a same lane;

wherein the lane recognition module is configured to recognize the number of traffic lanes based on the data supplied by the locating sensor about detected objects.

24. The collision warning device according to claim 1, wherein the danger parameter is a function of a necessary acceleration to avoid a collision, and wherein the decision unit reacts to both moving and stationary objects detected by the locating sensor.

25. The collision warning device according to claim 24, wherein different threshold values are provided for stationary and moving objects, and at least the threshold value provided for stationary objects is variable depending on the number of traffic lanes.

26. The collision warning device according to claim 24, further comprising:

a distance regulating system configured to regulate a distance of the host vehicle from a preceding vehicle traveling in a same lane;

wherein the lane recognition module is configured to recognize the number of traffic lanes based on the data supplied by the locating sensor about detected objects.

* * * * *